(12) United States Patent
Everett et al.

(10) Patent No.: US 8,930,043 B2
(45) Date of Patent: Jan. 6, 2015

(54) MACHINE CONTROL SYSTEM HAVING AUTONOMOUS RESOURCE QUEUING

(75) Inventors: Bryan J. Everett, Peoria, IL (US); Michael Siemer, Brisbane (AU); Craig L. Koehrsen, East Peoria, IL (US); Andrew J. Vitale, Peoria, IL (US); John R. Ellwood, Moorooka (AU)

(73) Assignee: Caterpillar Inc., Peoria, IL (US)

( * ) Notice: Subject to any disclaimer, the term of this patent is extended or adjusted under 35 U.S.C. 154(b) by 197 days.

(21) Appl. No.: 13/198,480

(22) Filed: Aug. 4, 2011

(65) Prior Publication Data

US 2012/0136509 A1     May 31, 2012

Related U.S. Application Data (60) Provisional application No. 61/418,316, filed on Nov. 30, 2010.

(51) Int. Cl.
*G05D 1/00* (2006.01)
*G01C 21/00* (2006.01)
*G05D 1/02* (2006.01)
*E02F 9/20* (2006.01)

(52) U.S. Cl.
CPC ............ *G05D 1/0291* (2013.01); *E02F 9/2045* (2013.01); *E02F 9/2054* (2013.01); *G05D 1/0274* (2013.01); *G05D 1/0278* (2013.01); *G05D 2201/0202* (2013.01)
USPC ...................... 701/2; 701/25; 701/26; 701/50

(58) Field of Classification Search
USPC ........................................... 701/2, 25, 26, 50
See application file for complete search history.

(56) References Cited

U.S. PATENT DOCUMENTS

| 4,600,999 A | 7/1986 | Ito et al. |
| 5,005,652 A | 4/1991 | Johnson |

(Continued)

FOREIGN PATENT DOCUMENTS

GB        2448972       11/2008

OTHER PUBLICATIONS

U.S. Patent Application of Bryan J. Everett et al. entitled "Machine Control System Having Autonomous Dump Queuing" filed on Aug. 4, 2011.

(Continued)

*Primary Examiner* — Fadey Jabr
*Assistant Examiner* — Yazan A Soofi
(74) *Attorney, Agent, or Firm* — Finnegan, Henderson, Farabow, Garrett & Dunner, LLP (57) ABSTRACT

A control system is disclosed for use with a plurality of mobile machines operating at a worksite having a resource. The control system may have a worksite controller configured to divide a common travel path into a plurality of segments, including at least a spot segment at the resource and a stage segment. The worksite control may further be configured to receive a first input indicative of a desire for a first of the plurality of mobile machines to leave the spot segment, and to direct the first of the plurality of mobile machines out of the spot segment based on the first input. The worksite controller may be further configured to receive first location information for the first of the plurality of mobile machines, and to direct the second of the plurality of mobile machines from the stage segment into the spot segment based on the first location information.

34 Claims, 4 Drawing Sheets

(56) References Cited

U.S. PATENT DOCUMENTS

| | | | |
|---|---|---|---|
| 5,375,663 | A | 12/1994 | Teach |
| 5,586,030 | A * | 12/1996 | Kemner et al. ............... 701/23 |
| 5,913,914 | A | 6/1999 | Kemner et al. |
| 5,925,081 | A | 7/1999 | Hawkins et al. |
| 5,931,875 | A | 8/1999 | Kemner et al. |
| 5,961,560 | A | 10/1999 | Kemner |
| 6,128,574 | A | 10/2000 | Diekhans |
| 6,134,493 | A | 10/2000 | Kaneko |
| 6,195,610 | B1 * | 2/2001 | Kaneko ......................... 701/25 |
| 6,236,924 | B1 | 5/2001 | Motz et al. |
| 6,246,932 | B1 * | 6/2001 | Kageyama et al. ............ 701/24 |
| 7,516,563 | B2 | 4/2009 | Koch |
| 2002/0143461 | A1 | 10/2002 | Burns et al. |
| 2004/0068352 | A1 | 4/2004 | Anderson |
| 2004/0158355 | A1 | 8/2004 | Holmqvist et al. |
| 2006/0069472 | A1 | 3/2006 | Makela |
| 2006/0149465 | A1 | 7/2006 | Park et al. |
| 2010/0076640 | A1 * | 3/2010 | Maekawa et al. ............. 701/26 |

OTHER PUBLICATIONS

U.S. Patent Application of Bryan J. Everett et al. entitled "Control System Having Tool Tracking" filed on Aug. 4, 2011.

U.S. Patent Application of Bryan J. Everett et al. entitled "System for Autonomous Path Planning and Machine Control" filed on Aug. 4, 2011.

U.S. Patent Application of Bryan J. Everett et al. entitled "System for Automated Excavation Planning and Control" filed on Aug. 4, 2011.

* cited by examiner

MACHINE CONTROL SYSTEM HAVING AUTONOMOUS RESOURCE QUEUING

RELATED APPLICATIONS

This application is based on and claims the benefit of priority from U.S. Provisional Application No. 61/418,316 by Bryan J. EVERETT, Michael SIEMER, Craig L. KOEHRSEN, Andrew J. VITALE, and John R. ELLWOOD, filed Nov. 30, 2010, the contents of which are expressly incorporated herein by reference.

TECHNICAL FIELD

The present disclosure relates generally to an autonomous machine control system, and more particularly, to a system for autonomously queuing operation of mobile machines and for controlling the mobile machines during operation based on the queuing.

BACKGROUND

Mobile machines such as haul trucks, scrapers, wheel loaders, and other types of heavy machinery are used to perform a variety of tasks. During the performance of these tasks, the machines often operate in conjunction with a limited resource, for example a loading machine such as an excavator or front shovel, or a processing machine such as a crusher or screen. When operating in conjunction with a limited resource, operation of a mobile machine relative to the resource and to other mobile machines competing for the same resource should be carefully managed to avoid machine collisions and to increase profit. The need to properly manage the machines can become even more important when the machines are autonomously controlled.

One attempt at managing operations of mobile machines relative to a limited resource is described in U.S. Pat. No. 5,586,030 (the '030 patent) issued to Kemner et al. on Dec. 17, 1996. In particular the '030 patent describes an autonomous vehicle system having a queue manager and a vehicle control system. The queue manager is configured to manage a fleet of autonomous dump trucks, and acts like a foreman assigning tasks to the trucks and tracking their progress as they perform the tasks The vehicle control system permits autonomous operation of each truck under the control of the queue manager.

When a truck of the '030 patent approaches a loader, the vehicle control system will communicate a queue position request to the queue manager, which will respond with a queue position based on a number of other trucks in the queue. The truck will then assume the assigned queue position. An operator of the loader will communicate a resource ready signal to the queue manager when it is ready to receive a truck from the queue. In response to this signal, the queue manager will allow a first truck in a first position in the queue to access the loader. When the first truck in the queue leaves the first queue position to access the resource, the truck will communicate a depart position signal to the queue manager. In response to the depart position signal, the queue manager updates the position of the next truck in the queue. As each truck moves, the process repeats until the position of every truck in the queue is updated. The vehicle control system knows the truck is approaching the resource as a result of detecting a queue trigger in the route being traveled. When the loader finishes loading the truck, the loader operator will cause a done signal to be sent to the queue manager, which will instruct the truck to leave the loader and resume following its route under fully autonomous control.

Although the system of the '030 patent may help manage trucks in conjunction with a common resource, the system may be limited. That is, the system of the '030 patent may do little to control spacing between trucks or reduce idle time of the resource between truck interactions.

The disclosed control system is directed to overcoming one or more of the problems set forth above and/or other problems of the prior art.

SUMMARY OF THE INVENTION

In one aspect, the present disclosure is directed to a control system for use with a plurality of mobile machines operating at a worksite having a resource. The control system may include a plurality of control modules, each associated with the plurality of mobile machines, and a worksite controller in communication with the plurality of control modules. The worksite controller may be configured to divide a common travel path of the plurality of mobile machines into a plurality of virtual segments, including at least a spot segment at the resource and a stage segment. The worksite controller may also be configured to receive a first input from an operator of the resource indicative of a desire for a first of the plurality of mobile machines to leave the spot segment, and to instruct a first of the plurality of control modules associated with the first of the plurality of mobile machines to direct the first of the plurality of mobile machines out of the spot segment based on the first input. The worksite controller may also be configured to receive first location information for the first of the plurality of mobile machines from the first of the plurality of control modules, and to instruct a second of the plurality of control modules associated with a second of the plurality of mobile machines to direct the second of the plurality of mobile machines from the stage segment into the spot segment based on the first location information.

In another aspect, the present disclosure is directed to a computer readable medium having computer executable instructions for performing a method of resource queuing. The method may include dividing a common travel path for a plurality of mobile machines into a plurality of virtual segments, including at least a spot segment at a resource and a stage segment. The method may also include receiving a first input from an operator of the resource indicative of a desire for a first of the plurality of mobile machines to leave the spot segment, and directing the first of the plurality of mobile machines out of the spot segment based on the first input. The method may further include receiving a first location information for the first of the plurality of mobile machines, and directing the second of the plurality of mobile machines from the stage segment into the spot segment based on the first location information.

DETAILED DESCRIPTION

Figure 1:
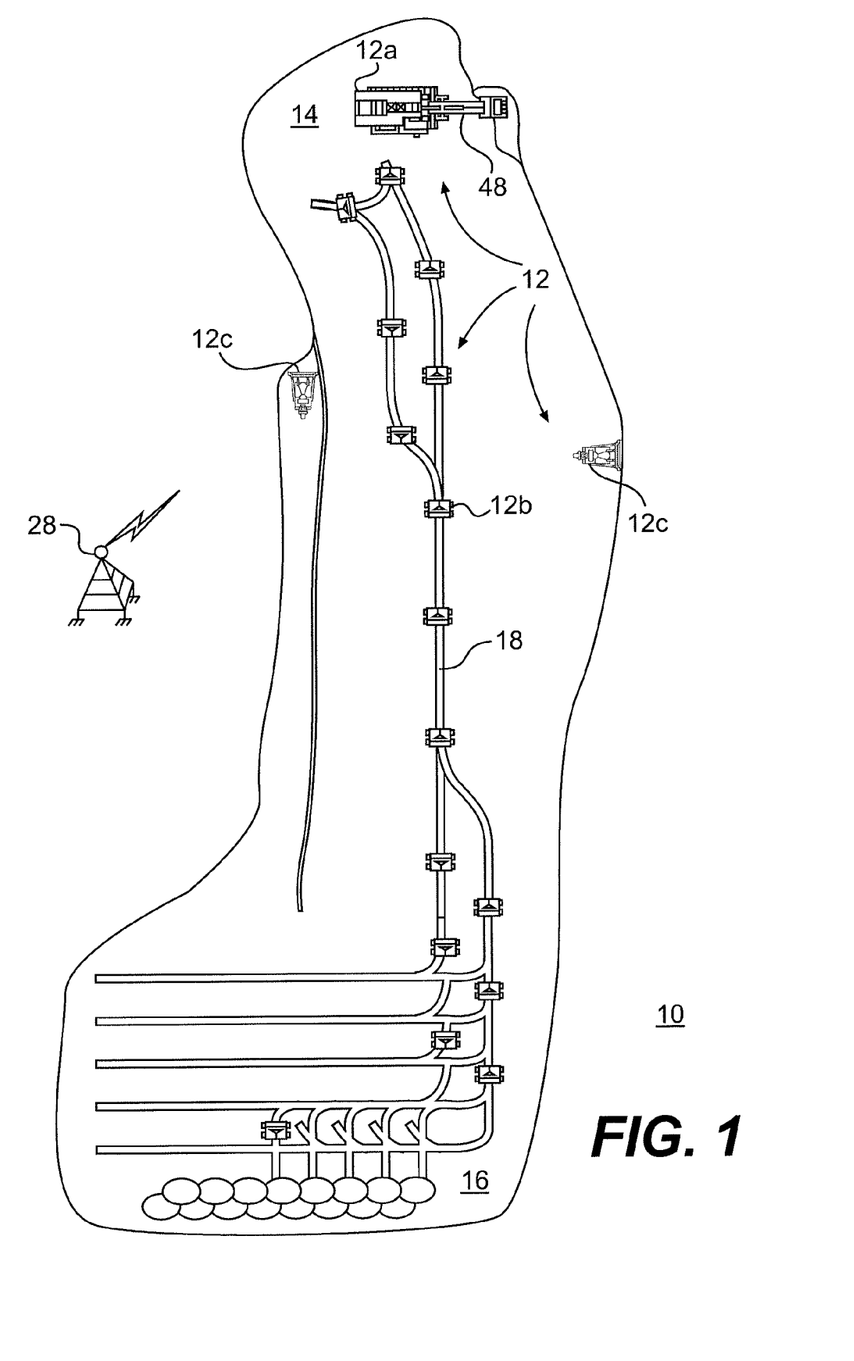
FIG. 1 is a pictorial illustration of an exemplary disclosed worksite.

FIG. 1 illustrates an exemplary worksite 10 having multiple, simultaneously-operable machines 12 performing a variety of predetermined tasks. Worksite 10 may include, for example, a mine site, a landfill, a quarry, a construction site, or any other type of worksite known in the art. The predetermined tasks may be associated with altering the current geography at worksite 10 and include a clearing operation, a leveling operation, a hauling operation, a digging operation, a loading operation, or any other type of operation that functions to alter the current geography at worksite 10.

Worksite 10 may include multiple locations designated for particular purposes. For example, a first location 14 may be designated as a load location at which a mobile loading machine 12*a* or other resource operates to fill multiple mobile haul machines 12*b* with material. For the purposes of this disclosure, a resource may be defined as a worksite asset shared by multiple machines for the completion of an assigned task. A second location 16 may be designated as a dump location at which machines 12*b* discard their payloads. Machines 12*b* may follow a travel path 18 that generally extends between load and dump locations 14, 16. One or more other mobile dozing or grading machines 12*c* at worksite 10 may be tasked with clearing or leveling load location 14, dump location 16, and/or travel path 18 such that travel by other machines 12 at these locations may be possible. As machines 12 operate at worksite 10, the shapes, dimensions, and general positions of load location 14, dump location 16, and travel path 18 may change. Machines 12 may be self-directed machines configured to autonomously traverse the changing terrain of worksite 10, manned machines configured to traverse worksite 10 under the control of an operator, or hybrid machines configured to perform some functions autonomously and other functions under the control of an operator. In the disclosed embodiment, at least some of machines 12 at worksite 10 are autonomously controlled.

Figure 2:
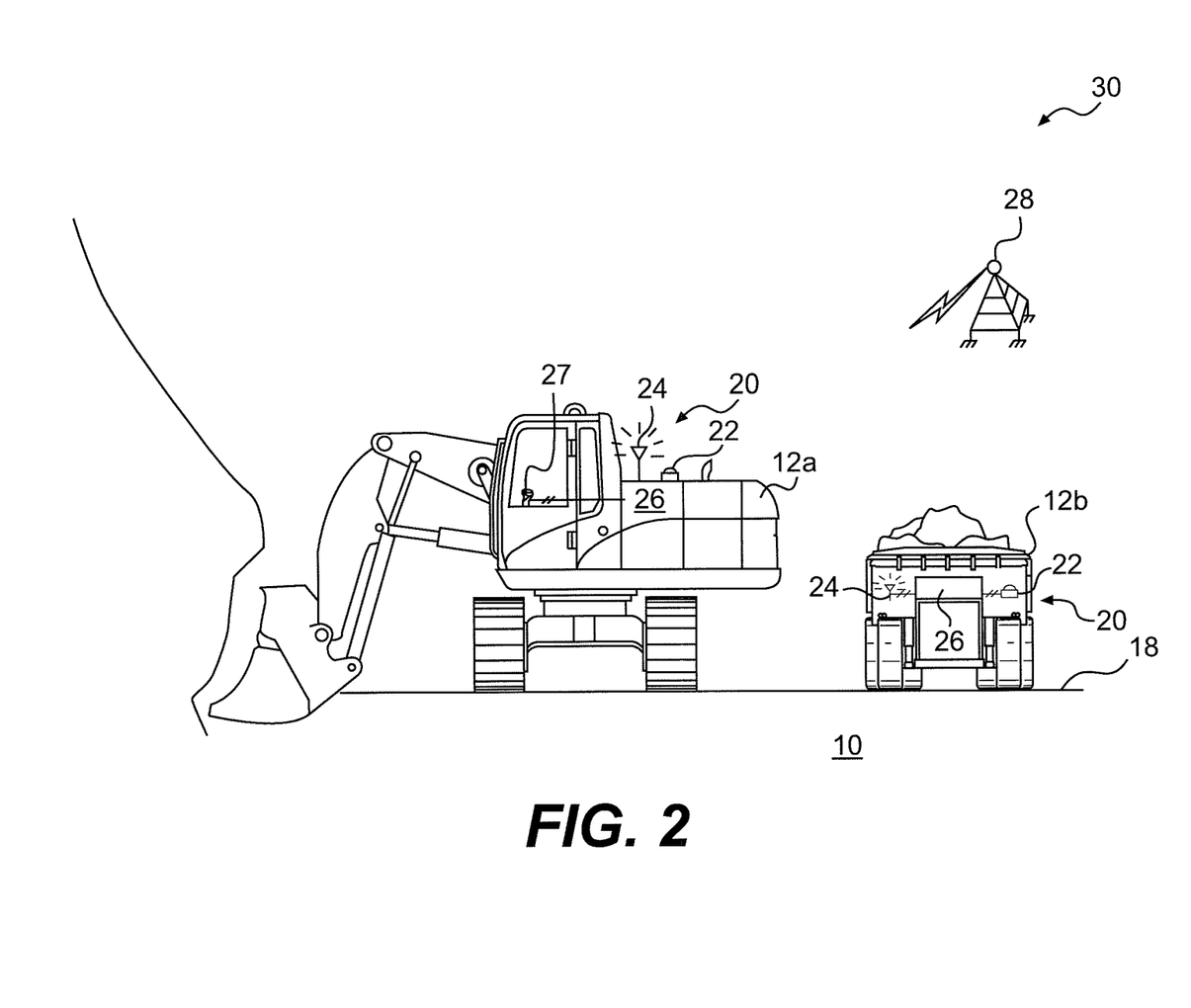
FIG. 2 is pictorial illustration of an exemplary disclosed control system that may be used at the worksite of FIG. 1.

As shown in FIG. 2, each machine 12 may be equipped with a control module 20 that facilitates or enhances autonomous and/or human control of machine 12. Control module 20 may include, among other things, a locating device 22, a communicating device 24, and an onboard controller (OC) 26 connected to locating device 22 and communicating device 24. When intended for use with a manually operated machine 12, control module 20 may also include one or more operator interface devices 27. Operator interface devices 27 may include, for example, an input device such as a joystick, keyboard, steering wheel, pedal, lever, button, switch, etc. Alternatively or additionally, operator interface devices 27 may include a display device such as a monitor, if desired.

Locating device 22 may be configured to determine a position of machine 12 and generate a signal indicative thereof. Locating device 22 could embody, for example, a Global Positioning System (GPS) device, an Inertial Reference Unit (IRU), a local tracking system, or any other known locating device that receives or determines positional information associated with machine 12. Locating device 22 may be configured to convey a signal indicative of the received or determined positional information to OC 26 for processing. It is contemplated that the location signal may also be directed to one or more of interface devices 27 (e.g., to the monitor) for display of machine location in an electronic representation of worksite 10, if desired.

Communicating device 24 may include hardware and/or software that enables sending of data messages between OC 26 and an offboard worksite controller (OWC) 28. OWC 28, together with each control module 20 of machines 12, may embody a control system 30. The data messages associated with control system 30 may be sent and received via a direct data link and/or a wireless communication link, as desired. The direct data link may include an Ethernet connection, a connected area network (CAN), or another data link known in the art. The wireless communications may include satellite, cellular, infrared, and any other type of wireless communications that enable communications device 24 to exchange information between OWC 28 and the components of control module 20.

Based on information from locating device 22 and instructions from OWC 28, each OC 26 may be configured to help regulate movements and/or operations of its associated machine 12 (e.g., direct movement of associated traction devices, work tools, and/or actuators; and operations of associated engines and/or transmissions). OC 26 may be configured to autonomously control these movements and operations or, alternatively, provide instructions to a human operator of machine 12 regarding recommended control. OC 26 may also be configured to send operational information associated with components of machine 12 offboard to OWC 28 via communicating device 24, if desired. This information may include, for example, the coordinates of machine 12, a traction device speed and/or orientation, tool and/or actuator positions, status information (e.g., temperatures, velocities, pressures, gear ratios, etc.), and other information known in the art.

OC 26 may embody a single or multiple microprocessors, field programmable gate arrays (FPGAs), digital signal processors (DSPs), etc., that include a means for controlling operations of machine 12 in response to operator requests, built-in constraints, sensed operational parameters, and/or communicated instructions from OWC 28. Numerous commercially available microprocessors can be configured to perform the functions of these components. Various known circuits may be associated with these components, including power supply circuitry, signal-conditioning circuitry, actuator driver circuitry (i.e., circuitry powering solenoids, motors, or piezo actuators), and communication circuitry.

OWC 28 may include any means for monitoring, recording, storing, indexing, processing, and/or communicating various operational aspects of work worksite 10 and machine 12. These means may include components such as, for example, a memory, one or more data storage devices, a central processing unit, or any other components that may be used to run an application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

OWC 28 may be configured to execute instructions stored on computer readable medium to perform methods of travel path planning for machines 12 at worksite 10. That is, as described above, the operation of machines 12 may cause changes to the geography of worksite 10 and, in order for machines 12, particularly those machines that are autonomously controlled, to adapt to the changing geography, travel path plans for machines 12 should also change to keep up with the changes in terrain. OWC 28 may execute instructions to perform a method of planning that generates travel paths 18 for machines 12, and communicates these travel paths 18 to the different control modules 20 for individual implementation.

Figure 3:
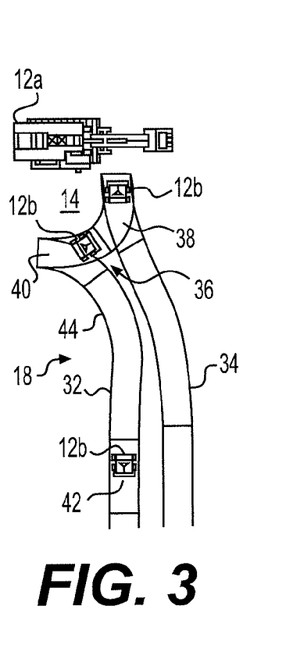
FIGS. 3-9 are pictorial illustrations of a portion of the worksite of FIG. 1.

The method of travel path planning may be associated with interaction between machines 12*b* and machine 12*a* at load location 14. As can be seen in FIG. 3, travel path 18 may be physically separated into a first or entry lane 32 that allows machines 12*b* to enter a proximity of machine 12*a* at load location 14 (i.e. to enter a space near machine 12a where machines 12b can be loaded by machine 12a), and a second or exit lane 34 that allows machines 12b to leave the proximity of machine 12b and travel towards dump location 16. A cusp 36 (i.e., a curved portion of travel path 18 where machine 12 may, in some situations, be required to shift gears and change travel directions) may connect first lane 32 to and at least partially overlap second lane 34 at load location 14. OWC 28 may execute instructions to selectively divide an electronic representation of travel path 18 at load location 14 into a plurality of virtual segments defined by coordinate boundaries at worksite 10. The virtual segments may include a spot segment 38 at machine 12a in which a machine 12b can be loaded, a stage segment 40 in which a machine 12b next in line for loading may wait, and a queue segment 42 in which additional machines 12b may wait for directed movement into stage segment 40. In some embodiments, one or more cushion segments 44 and/or interference segments 46 may be located between spot segment 38 and stage segment 40 and/or between stage segment 40 and queue segment 42, if desired. Cusp 36 may include a portion of any one or more of spot, stage, queue, cushion, and interference segments 38-46. As will be explained in more detail below, OWC 28 may manage movement of machines 12b between segments 38-46 to accomplish one or more user-defined goals.

The division of travel path 18 by OWC 28 into virtual segments may be based on a location of machine 12a as provided by the corresponding control module 20, the electronic representation of travel path 18, known characteristics of worksite 10 (i.e., contour, composition, obstacle location, etc.), and desired characteristics of cusp 36. FIGS. 3-8 illustrate different cusp designs generated by OWC 28 and the resulting virtual segmentation of travel path 18. For example, FIG. 3 illustrates a first cusp design where few, if any, significant space constraints at load location 14 exist, and machine 12b presents from the left of machine 12a. Because there may not be any significant space constraints in the embodiment of FIG. 3, spacing between lanes 32 and 34 may be generally maintained and lane overlapping may be minimal. In addition, stage segment 40 may be located immediately adjacent spot segment 38 for reduced time intervals between loading of different machines 12b. In this embodiment, as machine 12a moves across an excavation face 48 of worksite 10 (referring to FIG. 1) loading machines 12b, OWC 28 may maintain the general shape and size of spot, stage, and queue segments 38-42 substantially unchanged (i.e., the dimensions of spot and stage segments may remain substantially fixed), and simply change the length dimension of cushion segment 44 to accommodate the movement of machine 12a.

Figure 4:
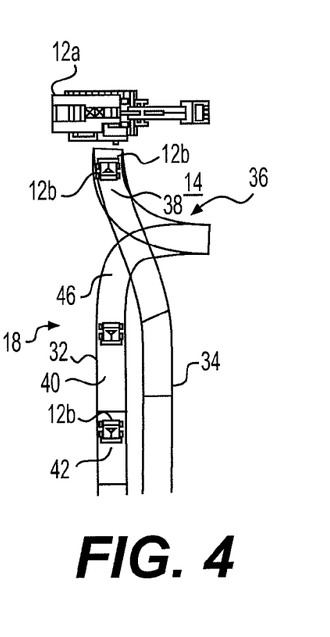

FIG. 4 illustrates an alternative cusp design, where machine 12b presents from the right. Because machine 12b presents from the right and therefore causes entry lane 32 to intersect with exit lane 34, an interference segment 46 may be positioned at the intersection between spot and stage segments 38, 40. In this configuration, OWC 28 may selectively delay an unloaded machine 12b from entering interference segment 46 and blocking exodus of a loaded machine 12b from spot segment 38. Presentation of machine 12b from the right may help to avoid a known obstacle at worksite 10 and/or present machine 12b in a better orientation for loading as compared to a left presentation.

Figure 5:
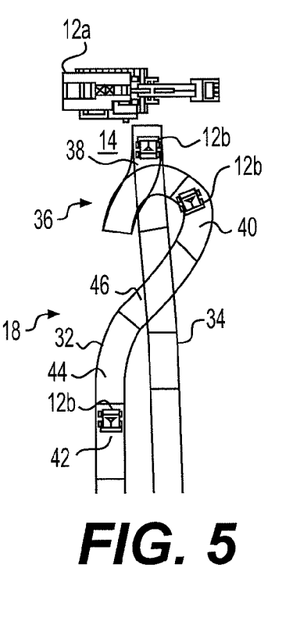

FIG. 5 illustrates yet another alternative cusp design, where machine 12b also presents from the right. This cusp design, however, may have curvature of greater radius as compared to the cusp design of FIG. 4. This greater curvature may help reduce stationary tire turning of machine 12b that results in less wear, which may be a goal defined by the user of control system 30. The cusp design of FIG. 5 also includes an additional interference segment 46 located between stage segment 40 and queue segment 42 to help inhibit an unloaded machine 12b moving between stage segment 40 and spot segment 38 from blocking a loaded machine 12b exiting spot segment 38.

Figure 6:
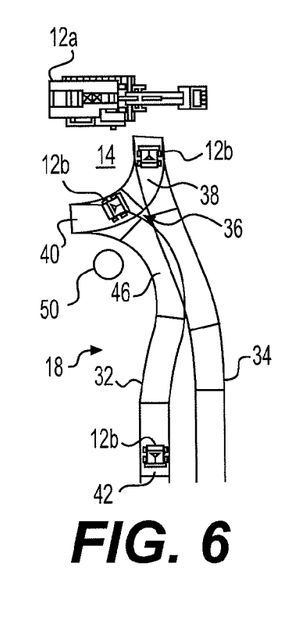

FIG. 6 illustrates a cusp design similar to that of FIG. 1. In FIG. 6, however, a significant obstacle 50 may be present at load location 14 that machines 12b should avoid. Accordingly, the cusp design of FIG. 6 shows entry lane 32 intentionally overlapping somewhat with exit lane 34, and an interference segment 46 positioned at the overlap.

Figure 7:
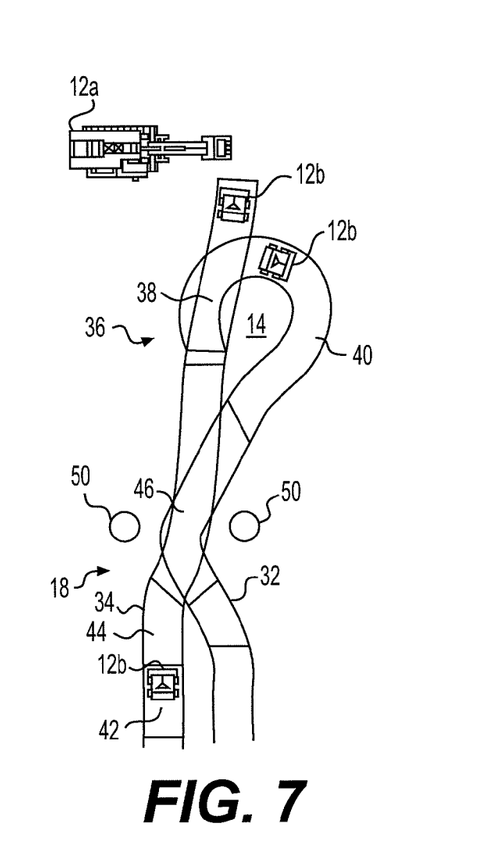

FIG. 7 illustrates a cusp design similar to that of FIG. 5. In FIG. 7, however, two obstacles 50 may be present that machines 12b should avoid. Accordingly, the cusp design of FIG. 7 shows lanes 32 and 34 overlapping, with interference segments 46 at the overlap. It is contemplated that lanes 32 and 34 could also be caused to overlap to reduce a footprint of travel path 18 and thereby conserve space at worksite 10 or reduce required travel path maintenance, which may be a goal defined by the user of control system 30.

Figure 8:
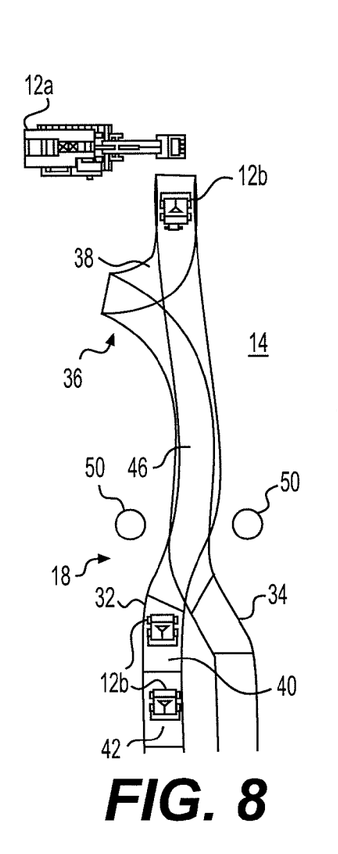

FIG. 8 illustrates a cusp design similar to that of FIG. 1. In FIG. 8, however, an available space at machine 12a may be limited and two obstacles 50 may be present that machine 12b should avoid. Accordingly, stage segment 40 may be located away from spot segment 38, with an interference segment 46 therebetween at a location of lane overlap caused by obstacles 50.

Figure 9:
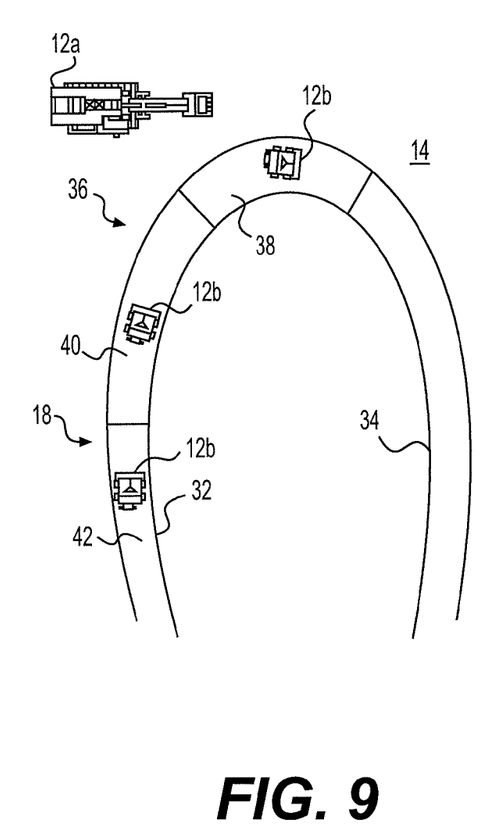

FIG. 9 illustrates a unique cusp design that does not require machines 12b to shift gears or change travel directions as machines 12b approach machine 12a for loading. FIG. 9, instead, illustrates machines cusp 36 having a simple curved shape outward of terminal ends of entry and exit lanes 32, 34, such that machines 12b drive always drive forward throughout their travel at load location, stop at spot segment 38, and then drive away in the same direction. In this arrangement, stage segment 40 may be located immediately adjacent spot segment 38 or apart from spot segment by a cushion segment 44 (not shown), with queue segment 42 located immediately adjacent stage segment 40.

OWC 28 may be triggered to divide travel path 18 into segments 38-46 and generate a new cusp design at load location 14 based on movement of machine 12a. That is, each time machine 12a changes its general position at load location 14, the segmentation of travel path 18 and the design of cusp 36 should also change to accommodate the movement of machine 12a and help ensure efficient loading of machines 12b. Accordingly, OWC 28 may initiate the required segmentation and cusp design generation when it is determined that the position of machine 12a at load location 14 has changed by at least a minimum amount. The minimum amount may be adjustable and set by an operator of machine 12a and/or the user of control system 30.

OWC 28 may automatically make the determination that machine 12a has changed by at least the minimum amount based on information provided by the corresponding control module 20. For example, when locating device 22 of machine 12a generates a signal received by OWC 28 via communicating device 24 indicative of a new loading machine position substantially different from a previous loading machine position, OWC 28 may responsively initiate segmentation and cusp design generation. Alternatively, when the operator of machine 12a manually signals that the loading machine position has changed, OCW 28 may consider the signal a designation of a new location for spot segment 38 and respond accordingly. The manual signal from the operator of machine 12a may be generated via interface device 27 and directed to OCW 28 via communicating device 24.

After segmenting travel path 18 into virtual segments 38-46 and after generating the required cusp design to accommodate user goals and connect entry lane 32 to exit lane 34, OCW 28 may execute instructions to regulate the movements of machines 12b relative to the different segments 38-46. In the case of autonomously controlled machines 12, control modules 20 of the corresponding machines 12 may be instructed by OCW 28 to direct operations of machines 12 relative to the different segments 38-46 of travel path 18. In the case of manually controlled machines 12, control modules 20 of the corresponding machines 12 may cause travel path 18, including cusp 36 and virtual segments 38-46, to be displayed in the form of an electronic terrain map provided on interface device 27, with associated instructions for the machine operator. The electronic terrain map may be a compilation of data stored in the memory of OCW 28 and periodically updated with the changes made to travel path 18 and/or the locations of machines 12 provided by corresponding locating devices 22.

In the disclosed embodiment, movement of machines 12b between segments 38-46 may be manually initiated by an operator of machine 12a. Specifically, after filling each of segments 38, 40, and 42 with a machine 12b, the operator of machine 12a may begin loading the machine 12b located in spot segment 38. When the operator of machine 12a has completed or is near completion of loading machine 12b, the operator may generate a status signal indicative of the loaded condition of machine 12b and indicative of a desire for the loaded machine 12b to leave spot segment 38. The loaded signal may be directed from control module 20 of machine 12a to OCW 28. In response to this signal, OCW 28 may instruct control module 20 of the loaded machine 12b to direct machine 12b to dump location 16 and discard its load.

During the movement of the loaded machine 12b toward dump location 16, machine 12b will eventually cross a virtual boundary of spot segment 38. The location of machine 12b during this time may be monitored by locating device 24 of its corresponding control module 20, with location information being passed to OCW 28 via communicating device 22. Once OCW 28, based on this location information and the electronic representation of travel path 18 stored in memory, determines that the loaded machine 12b has crossed the electronic boundary of spot segment 38, OCW 28 may instruct the control module 20 of machine 12b within stage segment 40 to direct movement into spot segment 38 for subsequent loading.

After stage segment 40 has been vacated, it may be up to the operator of machine 12a to determine if another machine 12b (i.e., a machine 12b in addition to the machine 12b already moving from stage segment 40 into spot segment 38) is desired for loading. If another machine 12b is desired for loading (i.e., if the operator of machine 12a desires that another machine 12b enters stage segment 40), the operator of machine 12a may generate a queue signal directed to OCW 28 informing OCW 28 of this desire. In response to the queue signal and based on confirmation that stage segment 40 is empty (i.e., that the machine 12b previously within stage segment 40 has crossed a virtual boundary to exit stage segment 40), OCW 28 may instruct the control module 20 of the machine 12b in queue segment 42 to direct that machine 12b into stage segment 40. Alternatively, it is contemplated that the movement of machine 12b from queue segment 42 into stage segment 40 may be automatically triggered based solely on tracked movement of a machine 12b out of stage segment 40 (i.e., without operator input), if desired. In situations where the virtual segmentation of travel path 18 results in cushion and/or interference segments 44, 46, OCW 28 may be configured to delay movements of machines 12b through cushion and/or interference segments 44, 46 and into stage and/or spot segments 38, 40 until the machine 12b exiting spot segment 38 has first moved through the cushion and/or interference segments 44, 46 that overlap with lane 34.

INDUSTRIAL APPLICABILITY

The disclosed control system may be applicable to a multi-machine operation where the machines repetitively traverse a common travel path. Although applicable to any type of machine, the disclosed control system may be particularly applicable to autonomously controlled machines where the machines are autonomously controlled to follow the travel path. The disclosed system may generate the travel path each time a desired position of the travel path changes (i.e., each time machine 12a moves by at least the minimum amount at load location 14), with characteristics of the travel path being based on worksite conditions and user goals.

Because control system 30 may manage movements of machines 12b accordingly to virtual segments 38-46, a spacing between machines 12b may be controlled. This spacing may help reduce collisions between machines 12b, while at the same time spacing machines 12b close together and close to machine 12a for reduced idle time between loading operations.

It will be apparent to those skilled in the art that various modifications and variations can be made to the disclosed system. Other embodiments will be apparent to those skilled in the art from consideration of the specification and practice of the disclosed system. It is intended that the specification and examples be considered as exemplary only, with a true scope being indicated by the following claims and their equivalents.

What is claimed is:

1. A control system for use with a plurality of mobile machines operating at a worksite having a resource, the control system comprising:
   a plurality of control modules, each associated with one of the plurality of mobile machines; and
   a worksite controller in communication with the plurality of control modules, the worksite controller being configured to:
      divide a common travel path of the plurality of mobile machines into a plurality of virtual segments, including at least a spot segment at the resource in which one of the plurality of mobile machines can be loaded, a stage segment in which one of the plurality of mobile machines can wait to be loaded, and a queue segment in which one of the plurality of mobile machines can wait to be directed to the stage segment;
      receive a first input from an operator of the resource indicative of a desire for a first of the plurality of mobile machines to leave the spot segment;
      instruct a first of the plurality of control modules associated with the first of the plurality of mobile machines to direct the first of the plurality of mobile machines out of the spot segment based on the first input;
      receive first location information for the first of the plurality of mobile machines from the first of the plurality of control modules; and
      instruct a second of the plurality of control modules associated with a second of the plurality of mobile machines to direct the second of the plurality of mobile machines out of the stage segment into the spot segment based on the first location information.

2. The control system of claim 1, wherein the stage segment is located adjacent the spot segment.

3. The control system of claim 1, wherein the plurality of segments further includes at least one of a cushion segment and an interference segment located between the spot segment and the stage segment.

4. The control system of claim 3, wherein the plurality of segments includes the cushion segment and a dimension of the cushion segment changes and the dimensions of the spot and stage segments remain substantially fixed as the resource moves.

5. The control system of claim 3, wherein the plurality of segments includes the interference segment and the worksite controller is configured to delay movement of the second of the plurality of mobile machines through the interference segment until the first of the plurality of mobile machines has moved through the interference segment.

6. The control system of claim 1, wherein
the worksite controller is further configured to:
receive second location information for the second of the plurality of mobile machines from a second of the plurality of control modules; and
instruct a third of the plurality of control modules associated with the third of the plurality of mobile machines to direct a third of the plurality of mobile machines from the queue segment into the stage segment based on the second location information.

7. The control system of claim 1, wherein
the worksite controller is further configured to:
receive a second input from the operator of the resource indicative of a desire for a third of the plurality of mobile machines to enter the stage segment; and
instruct a third of the plurality of control modules associated with the third of the plurality of mobile machines to direct the third of the plurality of mobile machines from the queue segment into the stage segment based on the second input.

8. The control system of claim 7, wherein the queue segment is located adjacent the stage segment.

9. The control system of claim 7, and an interference segment located between the queue segment and the stage segment.

10. The control system of claim 9, wherein the plurality of segments includes the cushion segment and a dimension of the cushion segment changes and the dimensions of the spot, stage, and queue segments remain substantially fixed as the resource moves.

11. The control system of claim 9, wherein the plurality of segments includes the interference segment and the worksite controller is configured to delay movement of the second of the plurality of mobile machines through the interference segment until the first of the plurality of mobile machines has moved through the interference segment.

12. The control system of claim 1, wherein:
the common travel path includes:
a first lane allowing the plurality of mobile machines to enter the spot segment; and
a second lane allowing the plurality of mobile machines to exit the spot segment; and
the worksite controller is further configured to generate a cusp at the resource for connection of the first lane to the second lane.

13. The control system of claim 12, wherein the cusp includes the stage segment.

14. The control system of claim 12, wherein generation of the cusp is based on at least one of an available space at the resource and a user-defined goal.

15. The control system of claim 12, wherein the cusp overlaps at least partially with the second lane.

16. The control system of claim 12, wherein the worksite controller is configured to:
receive a second input from the operator of the resource designating a new location for the spot segment; and
the cusp is generated based on the second input.

17. A non-transitory computer readable medium having computer executable instructions for performing a method of resource queuing, the method comprising:
dividing a common travel path for a plurality of mobile machines into a plurality of segments, including at least a spot segment at a resource in which one of the plurality of mobile machines can be loaded, a stage segment in which one of the plurality of mobile machines can wait to be loaded, and a queue segment in which one of the plurality of mobile machines can wait to be directed to the stage segment;
receiving a first input from an operator of the resource indicative of a desire for a first of the plurality of mobile machines to leave the spot segment;
directing the first of the plurality of mobile machines out of the spot segment based on the first input;
receiving a first location information for the first of the plurality of mobile machines; and
directing the second of the plurality of mobile machines from the stage segment into the spot segment based on the first location information.

18. The non-transitory computer readable medium of claim 17, wherein the stage segment is located adjacent the spot segment.

19. The non-transitory computer readable medium of claim 17, wherein the plurality of segments further includes at least one of a cushion segment and an interference segment located between the spot segment and the stage segment.

20. The non-transitory computer readable medium of claim 19, wherein the plurality of segments includes the cushion segment and the method further includes adjusting a dimension of the cushion segment and maintaining the dimensions of the spot and stage segments as the resource moves.

21. The non-transitory computer readable medium of claim 19, wherein the plurality of segments includes the interference segment and the method further includes delaying movement of the second of the plurality of mobile machines through the interference segment until the first of the plurality of mobile machines has moved through the interference segment.

22. The non-transitory computer readable medium of claim 17, wherein:
the method further includes:
receiving second location information for the second of the plurality of mobile machines; and
directing a third of the plurality of mobile machines from the queue segment into the stage segment based on the second location information.

23. The non-transitory computer readable medium of claim 17, wherein:
the method further includes:
receiving a second input from the operator of the resource indicative of a desire for a third of the plurality of mobile machines to enter the stage segment; and directing the third of the plurality of mobile machines from the queue segment into the stage segment based on the second input.

24. The non-transitory computer readable medium of claim 23, wherein the queue segment is located adjacent the stage segment.

25. The non-transitory computer readable medium of claim 23, wherein the plurality of segments further includes at least one of a cushion segment and an interference segment located between the queue segment and the stage segment.

26. The non-transitory computer readable medium of claim 25, wherein the plurality of segments includes the cushion segment and the method further includes changing a dimension of the cushion segment and maintaining the dimensions of the spot, stage, and queue segments as the resource moves.

27. The non-transitory computer readable medium of claim 25, wherein the plurality of segments includes the interference segment and the method further includes delaying movement of the second of the plurality of mobile machines through the interference segment until the first of the plurality of mobile machines has moved through the interference segment.

28. The non-transitory computer readable medium of claim 17, wherein:
the common travel path includes:
a first lane allowing the plurality of mobile machines to enter the spot segment; and
a second lane allowing the plurality of mobile machines to exit the spot segment; and
the method further includes generating a cusp at the resource for connection of the first lane to the second lane.

29. The non-transitory computer readable medium of claim 28, wherein the cusp includes the stage segment.

30. The non-transitory computer readable medium of claim 28, wherein generating the cusp includes generating the cusp based on at least one of an available space at the resource and a user-defined goal.

31. The non-transitory computer readable medium of claim 28, wherein the cusp overlaps at least partially with the second lane.

32. The non-transitory computer readable medium of claim 28, wherein:
the method further includes receiving a second input from the operator of the resource designating a new location for the spot segment; and
generating the cusp includes generating the cusp based on the second input.

33. A non-transitory computer readable medium having computer executable instructions for performing a method of resource queuing, the method comprising:
dividing a common travel path for a plurality of mobile machines into a plurality of segments, including at least a spot segment at a resource in which one of the plurality of mobile machines can be loaded, a stage segment located adjacent the spot segment in which one of the plurality of mobile machines can wait to be loaded, and a queue segment spaced apart from the stage segment by at least one of a cushion segment and an interference segment in which one of the plurality of mobile machines can wait to be directed to the stage segment;
receiving a first input from an operator of the resource indicative of a desire for a first of the plurality of mobile machines to leave the spot segment;
directing the first of the plurality of mobile machines out of the spot segment based on the first input;
receiving a first location information for the first of the plurality of mobile machines;
directing the second of the plurality of mobile machines from the stage segment into the spot segment based on the first location information;
receiving a second input from the operator of the resource indicative of a desire for a third of the plurality of mobile machines to enter the stage segment; and
directing the third of the plurality of mobile machines from the queue segment into the stage segment based on the second input.

34. The non-transitory computer readable medium of claim 33, wherein:
the common travel path includes:
a first lane allowing the plurality of mobile machines to enter the spot segment; and
a second lane allowing the plurality of mobile machines to exit the spot segment; and
the method further includes:
receiving a third input from the operator of the resource designating a new location for the spot segment; and
generating a cusp at the resource for connection of the first lane to the second lane based on at least one of an available space at the resource and a user-defined goal.

* * * * *